(12) United States Patent
Saha et al.

(10) Patent No.: US 8,254,544 B2
(45) Date of Patent: *Aug. 28, 2012

(54) N-WAYS CONFERENCE SYSTEM USING ONLY PARTICIPANTS' TELEPHONY DEVICES WITHOUT EXTERNAL CONFERENCE SERVER

(75) Inventors: Debanjan Saha, Mohegan Lake, NY (US); Zon-Yin Shae, South Salem, NY (US)

(73) Assignee: International Business Machines Corporation, Armonk, NJ (US)

( * ) Notice: Subject to any disclaimer, the term of this patent is extended or adjusted under 35 U.S.C. 154(b) by 1129 days.

This patent is subject to a terminal disclaimer.

(21) Appl. No.: 12/114,890

(22) Filed: May 5, 2008

(65) Prior Publication Data

US 2008/0198770 A1 Aug. 21, 2008

Related U.S. Application Data

(63) Continuation of application No. 10/945,379, filed on Sep. 20, 2004, now Pat. No. 7,496,188.

(51) Int. Cl.
*H04M 3/42* (2006.01)
(52) U.S. Cl. ............. 379/202.01; 370/260; 455/416
(58) Field of Classification Search .......... 379/202.01, 379/156, 158, 201.01; 370/259, 260; 384/14.01, 384/14.08; 455/414, 416
See application file for complete search history.

(56) References Cited

U.S. PATENT DOCUMENTS

| 6,577,622 | B1 * | 6/2003 | Schuster et al. ............. 370/352 |
| 7,006,455 | B1 * | 2/2006 | Fandrianto et al. .......... 370/260 |
| 7,298,834 | B1 * | 11/2007 | Homeier et al. ........ 379/202.01 |
| 2003/0023672 | A1 * | 1/2003 | Vaysman ..................... 709/203 |
| 2004/0137887 | A1 * | 7/2004 | Niemi .......................... 455/416 |
| 2004/0234059 | A1 * | 11/2004 | Lazarus et al. .......... 379/202.01 |

* cited by examiner

*Primary Examiner* — Khai N Nguyen
(74) *Attorney, Agent, or Firm* — Yee & Associates, P.C.; Louis J. Percello (57) ABSTRACT

An n-ways conferencing system using only the participants' telephony devices and without an external conference server. A plurality of telephony devices dial in to and report their mixing capability to a connection topology manager. The connection topology manager also determines the location of each telephony device and neighboring telephony device pairs in the conference service, as each telephony device is used for mixing voice signals of its closest neighbors, and calculates a minimum conference traffic delay for each telephony device. The connection topology manager then builds a topology for the conference service based on the mixing capability, location, and minimum conference traffic delay, wherein the connection topology manager distributes a mixing computation in a substantially uniform manner across the plurality of telephony devices. When a change in the network condition is detected, the connection topology manager rebuilds the topology to bypass the change in the network condition.

42 Claims, 6 Drawing Sheets

N-WAYS CONFERENCE SYSTEM USING ONLY PARTICIPANTS' TELEPHONY DEVICES WITHOUT EXTERNAL CONFERENCE SERVER

This application is a continuation of application Ser. No. 10/945,379, filed Sep. 20, 2004, now U.S. Pat. No. 7,496,188, issued Feb. 24, 2009.

BACKGROUND OF THE INVENTION

1. Technical Field

The present invention relates generally to an improved data processing system. More particularly, the present invention provides a conferencing system using only the participants' telephony devices and without an external conference server.

2. Description of Related Art

Telephone or audio conferencing allows three or more people to participate in a single telephone conversation. Each person is able to hear all the other callers when they speak and the conversation can progress as if all the callers were in the same room. Existing conferencing models include an external conferencing server model, a single end point mixing model, and a full mesh conferencing model.

Figure 1:
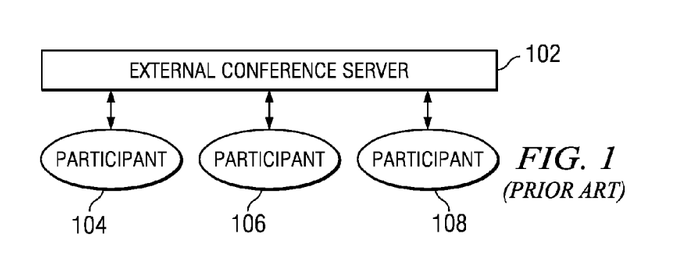
FIG. 1 is a known external centralized conferencing server model.

FIG. 1 illustrates a typical external conferencing server model. The external conference server model is the most common conference model used in the enterprise environment. The external conferencing server model provides a centralized conference server 102, wherein the conference server is an external machine. Each participant (104, 106, 108) in the conference makes use of a well-known center point, e.g., conference server 102, to join the conference. However, a drawback to this centralized approach is that this model is expensive to implement due to its large bandwidth and hardware computing power requirement.

Figure 2:
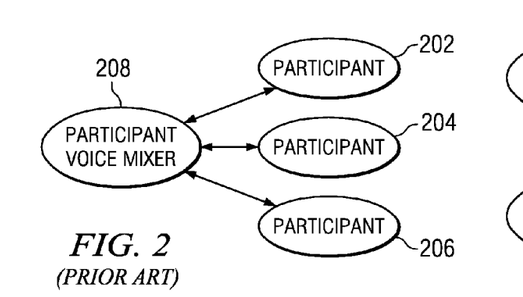
FIG. 2 is a known single end point mixing model.

FIG. 2 illustrates a single end point mixing model. In this model, every participant (202, 204, 206) to the conference makes use of a known center point among the conference participants (i.e., conference server 208) to join the conference. The center point may be a phone device (e.g., telephone, personal computer, etc.) that a participant used to join the conference. This central point itself functions as the conference server.

The single end point mixing model is typically found in the current PC gaming environment. As some phone devices support 3-way calling, a player may first download the conference server software into the player's PC. Then, the player offers other players to use the player's PC as a conference server. However, this internal conference server approach suffers from a number of limitations. First, a large amount of bandwidth in both directions (upstream and downstream) is required for the conference server PC network connection. Second, the internal conference server approach demands a large amount of CPU power for the voice mixing operations. Third, the internal conference server approach has a scalability problem due to the current asymmetrical bandwidth ADSL and cable networking environment, wherein the upstream bandwidth is very small compared with the bandwidth in the downstream direction. Moreover, a modem dial up connection will usually not have sufficient bandwidth to support the internal conference server model.

Figure 3:
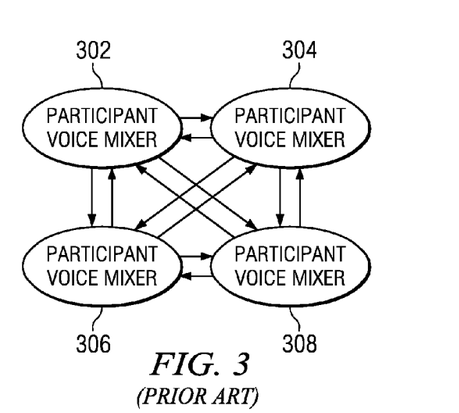
FIG. 3 is a known full mesh multicasting conferencing model.

FIG. 3 illustrates a typical full mesh conferencing model. In this model, each participant (302, 304, 306, 308) multicasts their voice stream to all other participants in the conference. Each participant's phone device is used as a mixing device. However, use of this model is limited due to the lack of multicast support across the current Internet. It is currently very difficult to make the multicast generally available across the Internet.

Therefore, it would be advantageous to have a method, apparatus, and computer instructions for providing an improved conferencing system using only the participants' telephony devices and without an external conference server.

SUMMARY OF THE INVENTION

The present invention provides a method, apparatus, and computer instructions for providing an n-ways conferencing system using only the participants' telephony devices and without an external conference server. A plurality of telephony devices dial in to a connection topology manager for a conference service, wherein at least one of the telephony devices in the plurality has 3-way mixing capability. Each telephony device reports its mixing capability to the connection topology manager. The connection topology manager also determines the location of each telephony device and neighboring telephony devices in the conference service, as each telephony device is used for mixing voice signals of its closest neighbors, and calculates a minimum conference traffic delay across all telephony devices. The connection topology manager then builds a topology for the conference service based on the mixing capability, location, network bandwidth, and minimum conference delay, wherein the connection topology manager distributes a mixing computation in a substantially uniform manner across the plurality of telephony devices.

When a change in the network condition, such as a connection failure, is detected, the connection topology manager rebuilds the topology to bypass the change in the network condition. In addition, the connection topology manager may also calculate a minimal minimum conference traffic delay and create the topology using a signaling protocol, such as session initiated protocol (SIP).

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 4:
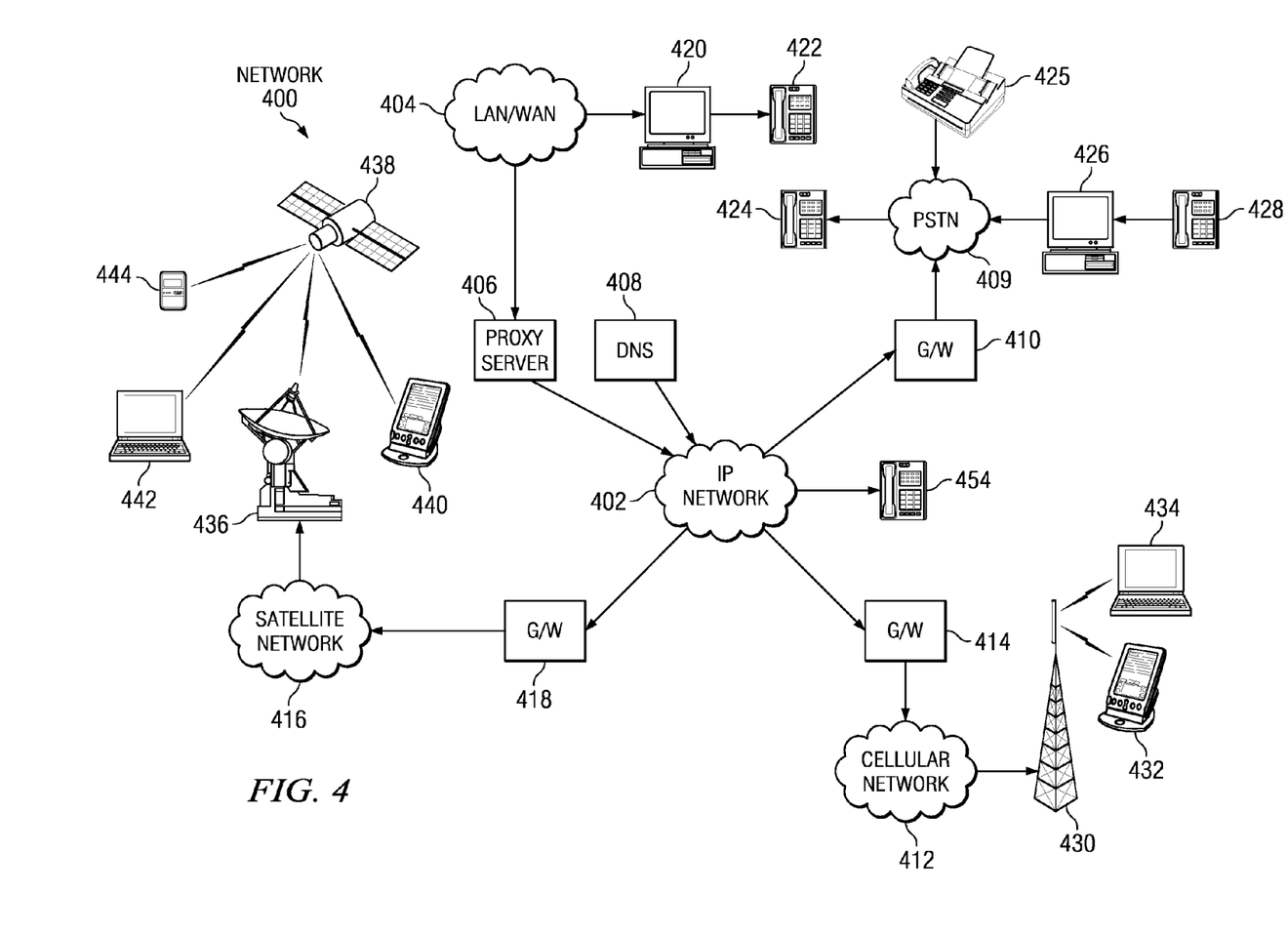
FIG. 4 is a diagram illustrating a distributed data processing and telephony system in which the present invention may be implemented.

With reference now to the figures, and in particular with reference to FIG. 4, a system diagram illustrating a distributed data processing and telephony system in which the present invention may be implemented is depicted.

Distributed data processing system 400 is a plurality of interconnected heterogeneous networks in which the present invention may be implemented. As illustrated, distributed data processing system 400 contains an Internet Protocol (IP) network 402, a Local Area Network (LAN)/Wide Area Network (WAN) 404, the Public Switched Telephone Network (PSTN) 409, a cellular wireless network 412, and a satellite communication network 416. Networks 402, 404, 409, 412, and 416 may include permanent connections, such as wire or fiber optic cables, or temporary connections made through telephone connections.

IP network 402 may be the publicly available IP network (the Internet), a private IP network, or a combination of public and private IP networks. In any case, IP network 402 operates according to the Internet Protocol and routes packets among its many switches and through its many transmission paths. IP networks are generally known in the art to be expandable, fairly easy to use and heavily supported. Coupled to IP network 402 is a Domain Name Server (DNS) 408 to which queries may be sent, such queries each requesting an IP address based upon a Uniform Resource Locator (URL). IP network 402 supports 32-bit IP addresses as well as 128-bit IP addresses, which are currently in the planning stage.

LAN/WAN 404 couples to IP network 402 via a proxy server 406 (or another connection). LAN/WAN 404 may operate according to various communication protocols, such as the Internet Protocol, the Asynchronous Transfer Mode (ATM) protocol, or other known packet switched protocols. Proxy server 406 serves to route data between IP network 402 and LAN/WAN 404. A firewall that precludes unwanted communications from entering LAN/WAN 404 may also be located at the location of proxy server 406.

Computer 420 couples to LAN/WAN 404 and supports communications with LAN/WAN 404. Computer 420 may employ the LAN/WAN and proxy server 406 to communicate with other devices across IP network 402. Such communications are generally known in the art and will not be further described herein except to expand upon the teachings of the present invention. As is also shown, phone 422 couples to computer 420 and may be employed to initiate IP Telephony communications with another phone or voice terminal using IP Telephony. An IP phone 454 connected to IP network 402 (or other phone, e.g., phone 424) may communicate with phone 422 using IP telephony.

PSTN (Public Switched Telephone Network) 409 is a circuit switched network that is primarily employed for voice communications, such as those enabled by a standard phone 424. However, PSTN 409 also supports the transmission of data. Data transmissions may be supported to a tone-based terminal, such as a FAX machine 425, to a tone-based modem contained in computer 426, or to another device that couples to PSTN 409 via a digital connection, such as an Integrated Services Digital Network (ISDN) line, an Asynchronous Digital Subscriber Line (ADSL), or another digital connection to a terminal that supports such a connection. As illustrated, a voice terminal, such as phone 428, may couple to PSTN 409 via computer 426 rather than being supported directly by PSTN 409, as is the case with phone 424. Thus, computer 426 may support IP telephony with voice terminal 428, for example. PSTN 409 accesses IP Network 402 via Gateway 410.

Cellular network 412 supports wireless communications with terminals operating in its service area (which may cover a geographic region such as a city, county, state, country, etc.). As is known, cellular network 412 includes a plurality of towers, e.g., 430, that each service communications within a respective cell. Wireless terminals that may operate in conjunction with cellular network 412 include wireless handsets 432 and wirelessly enabled laptop computers 434, for example. Wireless handsets 432 could be, for example, personal digital assistants, wireless or cellular telephones, or two-way pagers. Cellular network 412 couples to IP network 402 via gateway 414.

Wireless handsets 432 and wirelessly enabled laptop computers 434 may communicate with cellular network 412 using the Wireless Application Protocol (WAP) suite. WAP is an open, global specification that allows mobile users with wireless devices, such as, for example, mobile phones, pagers, two-way radios, smartphones, communicators, personal digital assistants, and portable laptop computers, to easily access and interact with information and services almost instantly. WAP is a communications protocol and application environment and can be built on any operating system including, for example, Palm OS, EPOC, Windows CE, FLEXOS, OS/9, and JavaOS. WAP provides interoperability even between different device families.

The WAP suite provides the wireless equivalent of Hypertext Transfer Protocol (HTTP) and Hypertext Markup Language (HTML). The HTTP-like component defines the communication protocol between the handheld device and a server or gateway. This component addresses characteristics that are unique to wireless devices, such as data rate and round-trip response time. The HTML-like component, Wireless Markup Language (WML), defines new markup and scripting languages for displaying information to and interacting with the user. This component is highly focused on the limited display size and limited input devices available on small, handheld devices. For example, a typical cell phone may have only a 4×10-character display with 16-gray levels and only a numeric keypad plus up/down volume keys.

Cellular network 412 operates according to an operating standard, which may be the Advanced Mobile Phone System (AMPS) standard, the Code Division Multiple Access (CMA) standard, the Time Division Multiple Access (DMA) standard, or the Global System for Mobile Communications or Groupie Special Mobile (GSM), for example. Independent of the standard(s) supported by cellular network 412, cellular network 412 supports voice and data communications with terminal units, e.g., 432 and 434.

Satellite network 416 includes at least one satellite dish 436 that operates in conjunction with a satellite 438 to provide satellite communications with a plurality of terminals, e.g., laptop computer 442, satellite handset 440, and pager 444. Satellite network 416 may be serviced by one or more geosynchronous orbiting satellites, a plurality of medium earth orbit satellites, or a plurality of low earth orbit satellites. In any case, satellite network 416 services voice and data communications and couples to IP network 402 via gateway 418.

FIG. 4 is intended as an example and not as an architectural limitation for the processes of the present invention. For example, distributed data processing system 400 may include additional servers, clients, and other devices not shown. The present invention would be most commonly used with devices such as computers 420 and 426, laptops 434 and 442, handsets 432 and 440, and pager 444. Sensitive data would be encrypted while transferred on IP network 402, would be decrypted at the recipient device, such as handset 432, then presented to the recipient using a secured form of rendering.

The present invention provides an improved conferencing system using only the conference participants' telephony devices. A telephony device may include, for example, a personal computer or a phone. In contrast with existing centralized conference server models, the present invention does not require an external conference server. Instead, the present invention allows each telephony device, or end point, in the conference to be used for the voice mixing of its closet neighbors. The mechanism of the present invention distributes as evenly as possible the large CPU power requirement for voice mixing across every participating end device in the conference. Voice mixing for telephony devices in the conference is thus distributed in a substantially uniform manner across the participating devices. In addition, the mechanism of the present invention also allows for implementation across every reasonable Internet accessing networking connections, (e.g., ADSL, cable modem, dial up modem, etc.), since the large bandwidth requirement for the conference server is also distributed as evenly as possible across every participating end device.

With the present invention, a low cost and pervasively available mechanism is provided that allows people to collaborate together with real time voice. The present invention is preferably used for gaming and enterprise real time collaboration, although it is not limited to a particular environment. The mechanism of the present invention may also be used to effectively distribute any data and media type to a set of collaborating participants. Although the present invention is best suited for small numbers of participants in each conference (group), any number of participants may be used. In addition, the present invention also supports large numbers of simultaneous conference groups as well.

Figure 5:
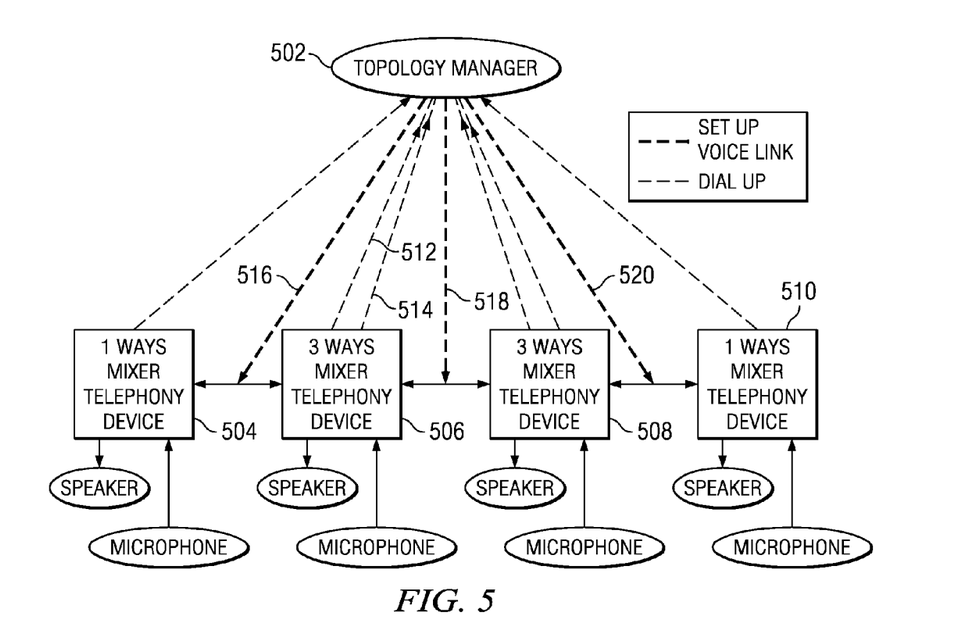
FIG. 5 is a block diagram illustrating exemplary components for implementing a preferred embodiment of the present invention.

Turning now to FIG. 5, a block diagram illustrating exemplary components for implementing a preferred embodiment of the present invention is shown. In this illustrative example, connection topology manager 502 is provided to set up and manage a connection topology. Connection topology manager 502 may reside in, for example, IP network 402 shown in FIG. 4. An end device, such as 3-ways mixer telephony device 506, calls connection topology manager 502 to join a conference. When 3-ways mixer telephony device 506 joins the conference, connection topology manager 502 informs other participants to the conference, such as 1-ways mixer telephony devices 504 and 510 and 3-ways mixer telephone device 508, of 3-ways mixer telephony device's 506 presence.

When an end device makes a call to connection topology manager 502, the end device reports its capability (e.g., n-ways mixers) by protocol to connection topology manager 502. For example, 3-ways mixer telephony device 506 calls connection topology manager 502 twice to explicitly register its two external voice connections, as shown by calls 512 and 514. This approach is especially useful if the telephony devices are regular telephones (plain old telephony (POT) devices) or a private branch exchange (PBX) system, such that they are not capable of running programs within themselves, in order to implement a more efficient protocol for reporting mixing capability to the connection topology manager. If a telephony device is a personal computer (PC), then it may only need to call the connection topology manager once and report its mixing capability simultaneously in the protocol. In response to the call, connection topology manager 502 uses a signaling protocol, such as session initiated protocol (SIP), to establish sessions in the IP network. A session can be a simple two-way telephone call or it may be a collaborative multi-media conference session. Once the sessions are created, connection topology manager 502 connects these voice real-time protocol (RTP) sessions, such as sessions 516, 518, and 520, among the participating conferencing telephony devices. In this manner, n-ways conferencing may be conducted without any dedicated conference server.

In addition, connection topology manager 502 may dynamically modify the connection topology in order to achieve better performance and service for the conference. Each end device may send probes to other end devices in the conference group in order to determine the status of the network connection. Connection topology manager 502 may also require that each end device send a "keep alive" signal to the connection topology manager. This signal is used to detect an end point failure (e.g., a user drops out the conference). The end devices then report the status of the network connections to connection topology manager 502. In this manner, connection topology manager 502 learns the geographical location of each end device and discovers the network condition amongst the participants as well. Based on the network condition information obtained, connection topology manager 502 dynamically changes and optimizes the existing connections to provide the best topology for connecting all of the participants.

Telephony end devices often have a built-in voice mixing capability. Typically, this built-in voice mixing capability is in the form of 3-ways mixing, which allows a user to utilize the telephony device to conduct a 3-ways conference. To implement the present invention, each telephony end device should have its own mixing capability, and the mixing capability may be built using a hardware chip or software program. The mixing capability of individual end device can be 1, 3, 4 or n-ways.

Figure 6:
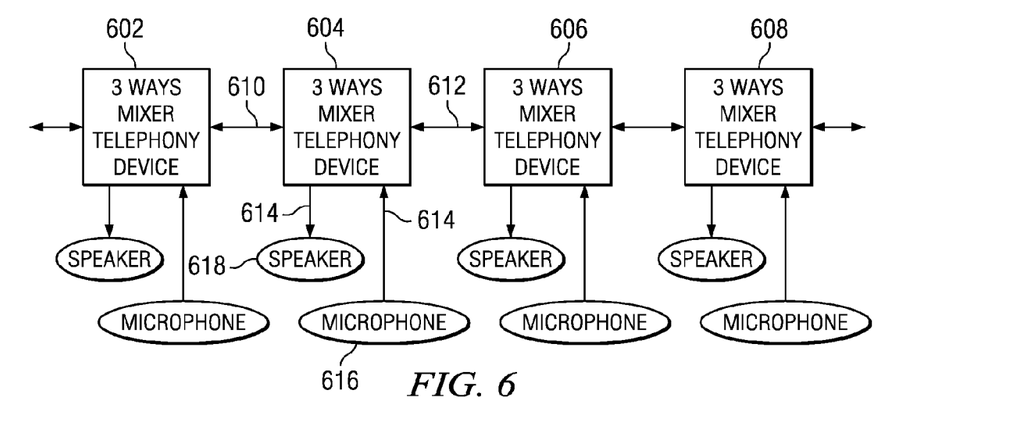
FIG. 6 is a block diagram of an n-ways conferencing model with 3-ways mixer telephony devices in accordance with the present invention.

FIG. 6 is a block diagram of an exemplary n-ways conferencing model with 3-ways mixer telephony devices in accordance with the present invention. In particular, FIG. 6 illustrates an example configuration of telephony devices containing 3-ways mixing capability to allow for n-way conferencing. Telephony devices shown in FIG. 6 may be implemented as an end device in the conferencing system, such as telephony end devices 504-510 in FIG. 5.

Telephony devices 602-608 are examples of 3-ways mixer telephony devices. In this illustrative example, each telephony device 602-608 has two external voice paths, such as external voice paths 610 and 612 for telephony device 604, and one internal voice path. The external voice paths are used to send mixed voice signals to the other telephony devices. For instance, external voice path 612 sends signals between telephony device 604 and telephony device 606. The internal voice path, such as internal voice path 614, is for use with a local microphone 616 and speaker 618. Connecting telephony devices in the manner illustrated in FIG. 6 allows for enable the n-ways conferencing as shown using these 3-ways mixing end points.

In addition, voice quality may degrade each time a decoding, adding, and encoding process is performed. With the present invention, voice quality is improved in each end device by first detecting voice activity in an end device before sending a signal to the device. If there is no voice activity in a particular telephony device, such as telephony device 604, the telephony device will not decode and encode an incoming voice stream. The telephony device only needs to modify the according packet format to improve the voice quality of the conference. This may be performed by using an algorithm that modifies the RTP packet header and relays the compressed voice payload as unchanged.

Figure 7:
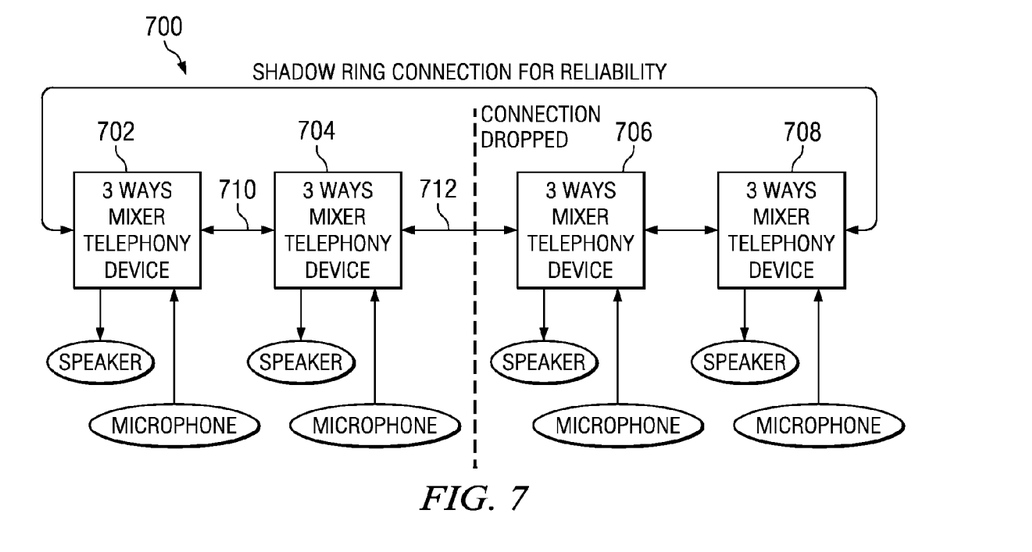
FIG. 7 is a block diagram illustrating a shadow ring architecture in accordance with the present invention.

Turning next to FIG. 7, a block diagram of an exemplary shadow ring architecture in accordance with the present invention is shown. The connection topology manager 502 in FIG. 5 may calculate multiple topologies (shadow topology) for a given conference service, such that the shadow topology may be utilized when one or more end points fail or network condition change. In particular, FIG. 7 depicts the exemplary n-ways conferencing model with 3-ways mixer telephony devices as shown in FIG. 6 including a shadow ring connection.

In this illustrative example, each telephony device 702-708 is shown to have two external voice paths to send mixed voice signals to the other telephony devices. For example, telephony device 704 has external voice path 710, which is used to send voice signals to telephony device 702, and external voice path 712, which is used to send voice signals to telephony device 706. To achieve system reliability, shadow ring connection 700 is used to connect telephony device 702-708 in such as manner as to avoid interruptions in service to the devices. For example, if the connection between telephony devices 704 and 706 in external voice path 712 is dropped, the connection between telephony devices 702 and 708 can be activated so as to maintain a ring connection. Thus, even if a connection is dropped in the shadow ring architecture, the conferencing service to the telephony devices will not be disrupted.

Figure 8:
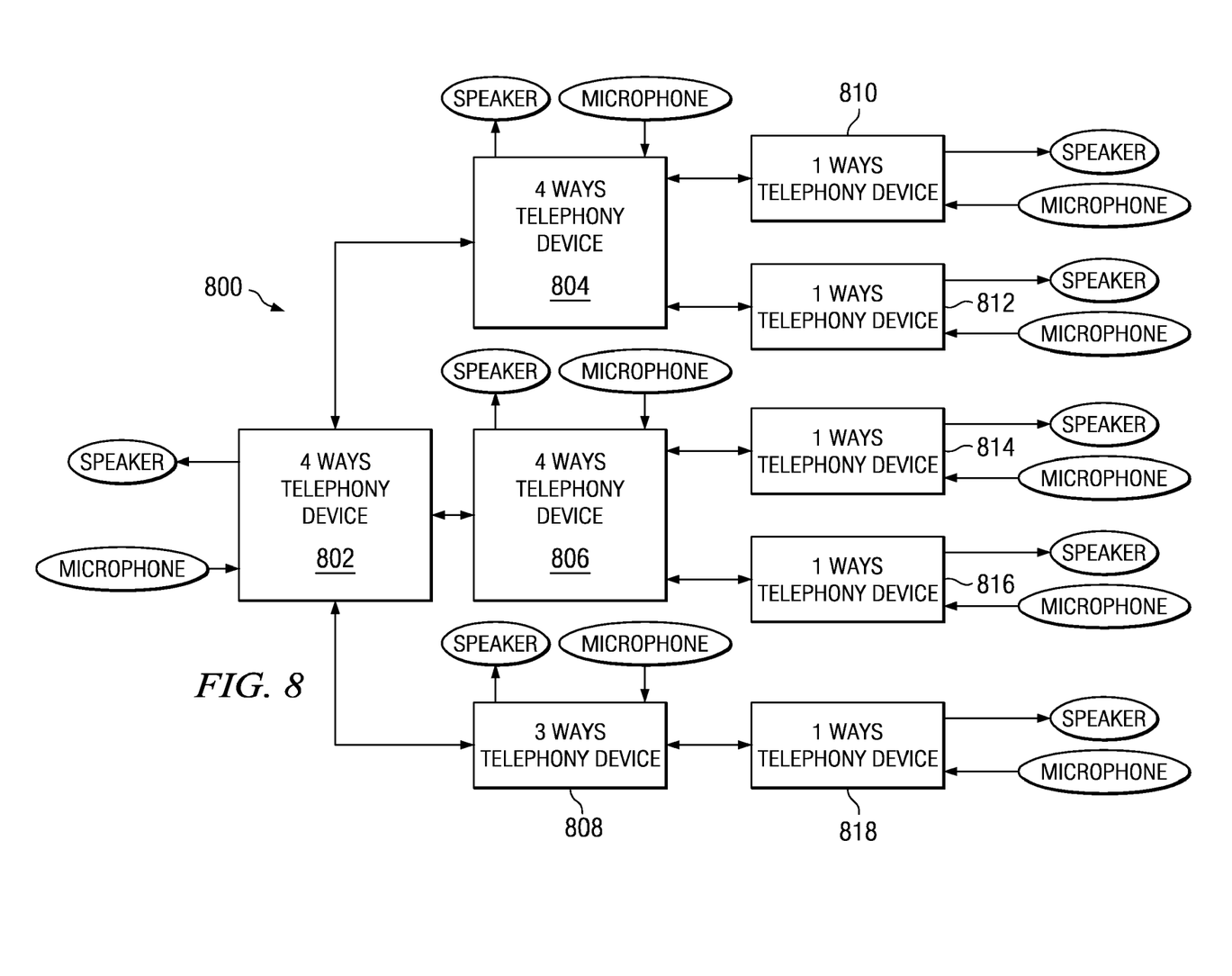
FIG. 8 is a block diagram of a connection topology for n-ways conferencing using heterogeneous telephony devices in accordance with the present invention.

FIG. 8 is a block diagram of an exemplary connection topology for n-ways conferencing using heterogeneous telephony devices in accordance with the present invention. Connection topology 800 includes various heterogeneous telephony devices, such as 4-ways telephony devices 802-806, 3-ways telephony device 808, and 1-ways telephony devices 810-818. Each telephony device shown has at least one external voice path. However, the multiple external voice paths of 4-ways telephony devices 802-806 and 3-ways telephony device 808 enable n-ways conferencing using heterogeneous 1, 3, and 4-ways mixer telephony devices.

Figure 9A:
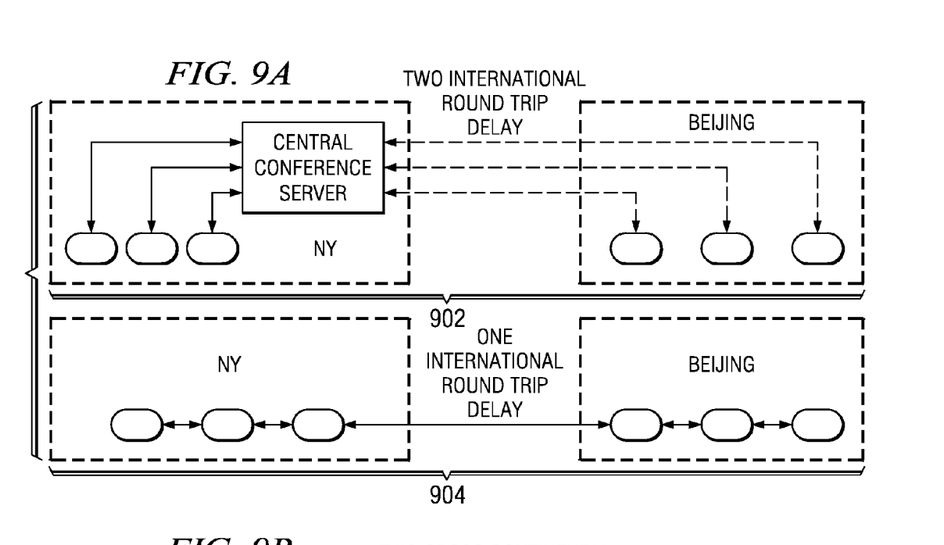
FIGS. 9A-9C are diagrams illustrating performance design considerations of the longest end-to-end delay in accordance with the present invention.
Figure 9B:
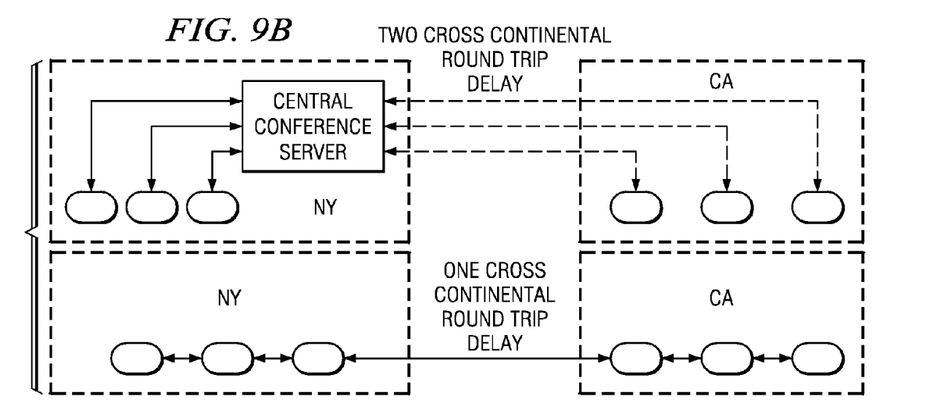
Figure 9C:
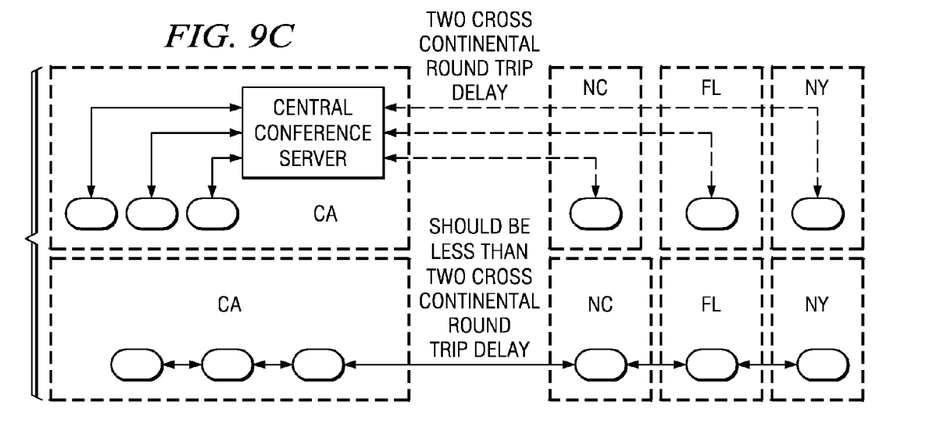

FIGS. 9A-9C are diagrams illustrating performance design considerations of the longest end-to-end delay in accordance with the present invention. As there may be a misconception that using the present invention will introduce more performance delay than the external centralized conference server model, FIGS. 9A-9C are provided to articulate the benefit of the mechanism of the present invention from the delay performance point of view. For example, FIG. 9A illustrates that delay performance in some long distance conference configurations, especially the international calls, may be improved using the present invention. Conference configuration 902 represents a conference call between New York and Beijing using a known external conference model. With the external conference model, conference performance delay for participants in Beijing would be two trips of international delay between Beijing and New York. In contrast, conference configuration 904 represents a conference call between New York and Beijing using the mechanism of the present invention. With the present invention, the conference performance delay for participants in Beijing is only one trip of international delay between Beijing and New York. FIGS. 9B and 9C are provided to similarly illustrate this improvement in performance delay using the continental United States geographical configuration.

Figure 10:
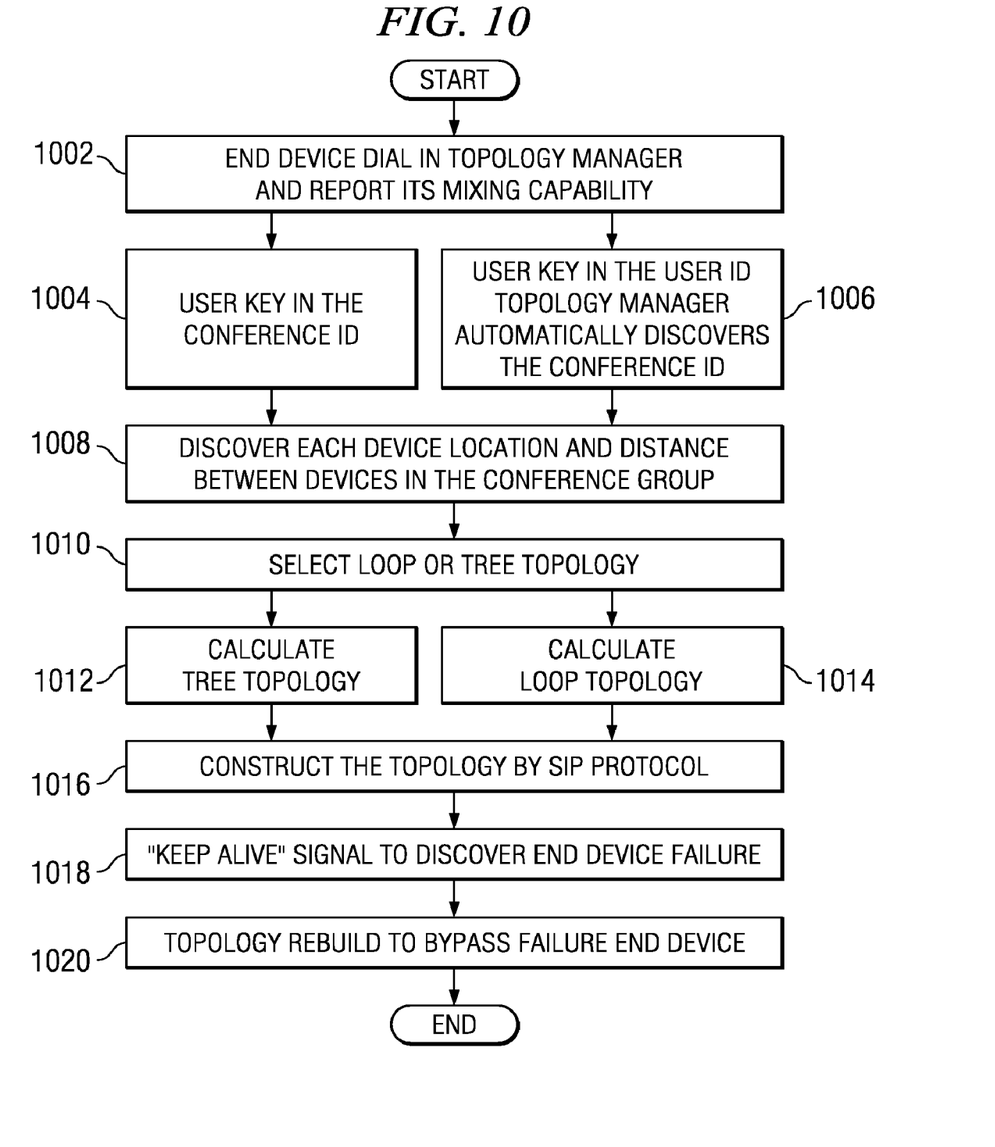
FIG. 10 is a flowchart of a process for providing a conferencing system using only the participants' telephony devices and without an external conference server.

FIG. 10 is a flowchart of a process for providing a conferencing system using only the participants' telephony devices and without an external conference server. The process illustrated in FIG. 10 may be implemented in a distributed data processing system, such as distributed data processing system 400 in FIG. 4.

The process begins with receiving a call to join a conference at a connection topology manager from an end device dialing in to the connection topology manager (step 1002). When an end device makes a call to the topology manager, the end device reports its mixing capability (n-ways mixers) using a signaling protocol to the topology manager. If the user of the end device knows the conference ID, the user uses this conference ID to identify to the connection topology manager the conference the user wants to join (step 1004). Alternatively, if the user does not know the conference ID, the connection topology manager may identify the conference ID based on the user ID (step 1006). For example, user sends the user's ID to the connection topology manager. The connection topology manager may consult a back-end database, for example, the user's calendar, to automatically obtain the conference ID for the user. This feature provides a more user-friendly environment for joining the conference. For instance, a mobile user in a car may easily dial into the connection topology manager without having to access the user's meeting calendar.

Next, using the information passed from the end device, the connection topology manager discovers the location of the end device and neighboring end devices in the conference group (step 1008). Once all of the end devices and their neighboring end devices are located, the connection topology manager selects a connection topology (tree or loop) based on all of the end devices information and the network bandwidth (step 1010). Based on the selected topology, the connection topology manager then builds the tree topology (step 1012) or loop topology (step 1014) conference traffic path architecture. At this point, only the conference traffic path architecture been calculated.

Next, the connection topology manager constructs the connection described by the topology using standard SIP protocol (step 1016). Also, each end device sends a "keep alive" signal to the connection topology manager (step 1018). This signal is used to detect an end point failure or if the user has decided to drop out the conference. If an end point failure is detected, the connection topology manager rebuilds the topology to bypass the failure (step 1020).

Thus, the present invention provides an improved conferencing model that does not include an external conference server. In the present invention, every end device participating in the conference is used for the voice mixing of its closet neighbors. Thus, the CPU power requirement for voice mixing is evenly distributed across every participating end device. In addition, the large bandwidth requirement for the conference server is also evenly as possible distributed across every participating end device. In this manner, the mechanism of the present invention may be used across every reasonable Internet accessing networking connection. As a result, it is a very low cost and pervasively available mechanism for collaborating with real time voice.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a data processing system for providing a n-ways conferencing, the computer implemented method comprising the steps of:
   receiving, by a connection topology manager, requests for a conference service from a plurality of telephony devices, wherein each telephony device in the plurality of telephony devices reports its level of voice mixing capability to the connection topology manager, and wherein the plurality of telephony devices includes a plurality of different levels of voice mixing capabilities;
   determining, by the connection topology manager using a central processing unit, a geographic location of each telephony device in the conference service, wherein each telephony device is used for mixing voice signals of its geographically closest telephony device neighbors;
   calculating, by the connection topology manager using the central processing unit, a minimum conference traffic delay between each telephony device in the conference service using network condition information obtained from probes sent between telephone devices in the conference service;
   calculating, by the connection topology manager using the central processing unit, a plurality of connection topologies to connect the plurality of telephony devices in the conference service to form a plurality of calculated connection topologies; and
   selecting, by the connection topology manager using the central processing unit, a connection topology within the plurality of calculated connection topologies to connect the plurality of telephony devices in the conference service based on the level of voice mixing capability of each telephony device, the geographic location of each telephony device, and the minimum conference traffic delay between each telephony device.

2. The computer implemented method of claim 1, further comprising:
   detecting, by the connection topology manager, a change in a network condition; and
   rebuilding, by the connection topology manager, the connection topology to bypass the change in the network condition.

3. The computer implemented method of claim 2, wherein rebuilding the connection topology to bypass the change in the network condition is performed using a shadow ring.

4. The computer implemented method of claim 2, wherein the change in the network condition is a telephony device connection failure.

5. The computer implemented method of claim 4, wherein the telephony device connection failure occurs when a participant leaves a conference.

6. The computer implemented method of claim 1, wherein each telephony device sends a keep alive signal to the connection topology manager.

7. The computer implemented method of claim 1, wherein a session initiated protocol is used in building the connection topology.

8. The computer implemented method of claim 1, wherein each telephony device contains its own voice mixing capability.

9. The computer implemented method of claim 8, wherein the voice mixing capability is built with a hardware chip.

10. The computer implemented method of claim 8, wherein the voice mixing capability is one of one, three, four, or n-ways.

11. The computer implemented method of claim 1, wherein a telephony device decodes and encodes an incoming voice stream only if voice activity in the telephony device is present in order to improve voice quality by reducing a number of the voice mixing operations of a given conference.

12. The computer implemented method of claim 1, wherein the plurality of telephony devices includes at least one passive telephony device, wherein the at least one passive telephony device cannot accept additional code.

13. The computer implemented method of claim 12, wherein the at least one passive telephony device calls the connection topology manager multiple times to indicate its level of voice mixing capability to the connection topology manager.

14. The computer implemented method of claim 12, wherein the at least one passive telephony device is a private branch exchange system.

15. A data processing system for providing a n-ways conferencing, comprising:
   a central processing unit;
   receiving means for receiving, by a connection topology manager, requests for a conference service from a plurality of telephony devices, wherein each telephony device in the plurality of telephony devices reports its level of voice mixing capability to the connection topology manager, and wherein the plurality of telephony devices includes a plurality of different levels of voice mixing capabilities;
   determining means for determining, by the connection topology manager, a geographic location of each telephony device in the conference service, wherein each telephony device is used for mixing voice signals of its geographically closest telephony device neighbors;
   calculating means for calculating, by the connection topology manager, a minimum conference traffic delay between each telephony device in the conference service using network condition information obtained from probes sent between telephone devices in the conference service;
   calculating means for calculating, by the connection topology manager, a plurality of connection topologies to connect the plurality of telephony devices in the conference service to form a plurality of calculated connection topologies; and
   selecting means for selecting, by the connection topology manager, a connection topology within the plurality of calculated connection topologies to connect the plurality of telephony devices in the conference service based on the level of voice mixing capability of each telephony device, the geographic location of each telephony device, and the minimum conference traffic delay between each telephony device.

16. The data processing system of claim 15, further comprising:
   detecting means for detecting, by the connection topology manager, a change in a network condition; and
   building means for rebuilding, by the connection topology manager, the connection topology to bypass the change in the network condition.

17. The data processing system of claim 16, wherein rebuilding the connection topology to bypass the change in the network condition is performed using a shadow ring.

18. The data processing system of claim 16, wherein the change in the network condition is a telephony device connection failure.

19. The data processing system of claim 18, wherein the telephony device connection failure occurs when a participant leaves a conference.

20. The data processing system of claim 15, wherein each telephony device sends a keep alive signal to the connection topology manager.

21. The data processing system of claim 15, wherein a session initiated protocol is used in building the connection topology.

22. The data processing system of claim 15, wherein each telephony device contains its own voice mixing capability.

23. The data processing system of claim 22, wherein the mixing capability is built with a hardware chip.

24. The data processing system of claim 22, wherein the voice mixing capability is one of one, three, four, or n-ways.

25. The data processing system of claim 15, wherein a telephony device decodes and encodes an incoming voice stream only if voice activity in the telephony device is present in order to improve voice quality by reducing a number of the voice mixing operations of a given conference.

26. The data processing system of claim 15, wherein the plurality of telephony devices includes at least one passive telephony device, wherein the at least one passive telephony device cannot accept additional code.

27. The data processing system of claim 26, wherein the at least one passive telephony device calls the connection topology manager multiple times to indicate its level of voice mixing capability to the connection topology manager.

28. The data processing system of claim 26, wherein the at least one passive telephony device is a private branch exchange system.

29. A computer program product stored in a non-transitory computer readable medium having instructions embodied therein that are executable by a central processing unit for providing a n-ways conferencing, comprising:
   first instructions for receiving, by a connection topology manager, requests for a conference service from a plurality of telephony devices, wherein each telephony device in the plurality of telephony devices reports its level of voice mixing capability to the connection topology manager, and wherein the plurality of telephony devices includes a plurality of different levels of voice mixing capabilities;
   second instructions for determining, by the connection topology manager, a geographic location of each telephony device in the conference service, wherein each telephony device is used for mixing voice signals of its geographically closest telephony device neighbors;
   third instructions for calculating, by the connection topology manager, a minimum conference traffic delay between each telephony device in the conference service using network condition information obtained from probes sent between telephone devices in the conference service;
   fourth instructions for calculating, by the connection topology manager, a plurality of connection topologies to connect the plurality of telephony devices in the conference service to form a plurality of calculated connection topologies; and
   fifth instructions for selecting, by the connection topology manager, a connection topology within the plurality of calculated connection topologies to connect the plurality of telephony devices in the conference service based on the level of voice mixing capability of each telephony device, the geographic location of each telephony device, and the minimum conference traffic delay between each telephony device.

30. The computer program product of claim 29, further comprising:
   sixth instructions for detecting, by the connection topology manager, a change in a network condition; and
   seventh instructions for rebuilding, by the connection topology manager, the connection topology to bypass the change in the network condition.

31. The computer program product of claim 30, wherein rebuilding the connection topology to bypass the change in the network condition is performed using a shadow ring.

32. The computer program product of claim 30, wherein the change in the network condition is a telephony device connection failure.

33. The computer program product of claim 32, wherein the telephony device connection failure occurs when a participant leaves a conference.

34. The computer program product of claim 29, wherein each telephony device sends a keep alive signal to the connection topology manager.

35. The computer program product of claim 29, wherein a session initiated protocol is used in building the connection topology.

36. The computer program product of claim 29, wherein each telephony device contains its own voice mixing capability.

37. The computer program product of claim 36, wherein the mixing capability is built with a hardware chip.

38. The computer program product of claim 36, wherein the voice mixing capability is one of one, three, four, or n-ways.

39. The computer program product of claim 29, wherein a telephony device decodes and encodes an incoming voice stream only if voice activity in the telephony device is present in order to improve voice quality by reducing a number of the voice mixing operations of a given conference.

40. The computer program product of claim 29, wherein the plurality of telephony devices includes at least one passive telephony device, wherein the at least one passive telephony device cannot accept additional code.

41. The computer program product of claim 40, wherein the at least one passive telephony device calls the connection topology manager multiple times to indicate its level of voice mixing capability to the connection topology manager.

42. The computer program product of claim 40, wherein the at least one passive telephony device is a private branch exchange system.

* * * * *